(12) United States Patent
Pai et al.

(10) Patent No.: US 6,595,023 B2
(45) Date of Patent: Jul. 22, 2003

(54) STRUCTURE OF EVAPORATION REGION OF ABSORPTION DIFFUSION TYPE REFRIGERATING CIRCULATION

(75) Inventors: Hao Pai, Hsintien (TW); Ru He Jan, Hsintien (TW); Chin Hung Kuo, Hsintien (TW)

(73) Assignee: Heat Energy Advanced Technology Corp., Taipei Hsien (TW)

( * ) Notice: Subject to any disclaimer, the term of this patent is extended or adjusted under 35 U.S.C. 154(b) by 8 days.

(21) Appl. No.: 10/143,934

(22) Filed: May 14, 2002

(65) Prior Publication Data

US 2002/0170311 A1 Nov. 21, 2002

(30) Foreign Application Priority Data

May 18, 2001 (TW) ........................................ 90112044 A

(51) Int. Cl.[7] ................................................. F25B 15/10
(52) U.S. Cl. ........................................... 62/490; 62/492
(58) Field of Search .......................... 62/490, 491, 492, 62/493, 498, 101, 476

(56) References Cited

U.S. PATENT DOCUMENTS

| 4,051,694 A | * | 10/1977 | Enger ......................... 62/490 |
| 4,137,727 A | * | 2/1979 | Kuhlenschmidt ............ 62/490 |
| 5,865,039 A | * | 2/1999 | Muller et al. ................. 62/490 |

* cited by examiner

*Primary Examiner*—Melvin Jones
(74) *Attorney, Agent, or Firm*—Rosenberg, Klein & Lee

(57) ABSTRACT

The present invention provides a structure of an evaporation region of an absorption diffusion type refrigerating circulation. The refrigerating circulation comprises a generator, a rectifier, a condenser, an evaporator, a concentrated ammonia aqueous solution tank, and an absorber. An ammonia liquid pipe and a hydrogen pipe are arranged in a pipeline of the evaporator. The evaporator at the evaporation region has a simple shape and structure, and can be processed easily, hence saving the space thereof. Because the ammonia liquid pipe and the hydrogen pipe are arranged in the evaporator, the effect of heat exchange thereof is better, and the refrigerating temperature is lower.

9 Claims, 8 Drawing Sheets

STRUCTURE OF EVAPORATION REGION OF ABSORPTION DIFFUSION TYPE REFRIGERATING CIRCULATION

FIELD OF THE INVENTION

The present invention relates to a structure of the evaporation region of an absorption diffusion type refrigerating circulation and, more particularly, to an arrangement way of a common pipe type evaporator in a refrigerating structure of largely shrunk volume and reduced weight.

BACKGROUND OF THE INVENTION

A conventional refrigerating circulation system of an air conditioner comprises mainly a titanium heat pipe generator 1, a hydrogen chest 2, a separator 3, a liquid heat exchanger 4, an absorber 5, a dehydrator 6, a condenser 7, an evaporator 8, an air heat exchanger 9, a filter pipe 10, an analyzer 11, a U-shaped pipe 12, a fan 13, and a mineral wool plate 14. Ammonia aqueous solution has a high latent heat to be used as a refrigerant. Because water can absorb a large amount of ammonia vapor at room temperature and pressure, and the absorbed ammonia will divagate from water when water is heated, water is used as an absorptive agent in reverse process. Moreover, hydrogen gas will accelerate the evaporation rate of ammonia to provide low partial pressure for the system. For a system achieving absorption refrigerating circulation through gravity and heat, the whole system is non-mechanical. There will be no action of revolution of compressor, not to mention sound of revolution of compressor.

As shown in FIG. 1, heat is added to the generator 1 to let ammonia vapor divagate from the solution after the titanium heat pipe is electrified. The ammonia vapor having heat will rise along the filter pipe 10 and carry part solution to enter the separator 3, where the vapor and the liquid will separately flow along pipeline 3a and 3b, respectively. The liquid flows into the liquid heat exchanger 4 from the pipeline 3b by gravity, and then reaches the absorber 5. The vapor in the separator 3 descends and diverts to the analyzer 11 from the central pipeline 3a. Because the vapor is lighter, after it rises to the dehydrator 6, if there is still any water or condensed liquid, they will flow downwards to the analyzer 11 and then back into the generator 1. The dehydrator 6 has a plurality of annular baffle plates 6a to block the vapor from carrying liquid upwards.

After passing the dehydrator 6, pure ammonia is obtained to enter the condenser 7, which is divided into a condensing pipe 7a and a condensing pipe 7b. The condensing pipe 7a has fins capable of condensing part of the vapor. Heat in the system is only utilized in upward circulation and only to the condensing pipe 7a. Subsequent circulation relies only on gravity to let pure ammonia flow to the evaporator 8. Additionally, the vapor not condensing at the condensing pipe 7a rises to the condensing pipe 7b and then condenses there. The U-shaped pipe 12 between the condenser 7 and the evaporator 8 is used for storing ammonia liquid. When the storage of ammonia liquid exceeds a predetermined level, the ammonia liquid will flow into the evaporator 8. Because the liquid is affected by gravity, horizontal equilibrium is accomplished.

After the liquid brims the U-shaped pipe 12, it will flow into the evaporator 8. When the ammonia liquid enters the evaporator 8 and forms a thin film of ammonia liquid on a series of horizontal baffle plates 8a, hydrogen gas will fill into the U-shaped pipe 12 to decrease the pressure of the ammonia liquid to a designed standard, so that the ammonia liquid can evaporate at low temperatures. When the ammonia liquid evaporates, it will absorb heat, hence accomplishing the effect of condensation. The vapor will be discharged by the fan 13 and be isolated by the mineral wool plate 14.

The more the hydrogen gas, the less the ammonia vapor, and the lower the temperature thereof. When the ammonia liquid is evaporated and mixed with the hydrogen gas, the mixed gas will be heavier than the hydrogen gas, and will descends into the absorber 5 along an inner pipe 9a of the vapor heat exchanger 9. Simultaneously, the hydrogen gas rising from an outer pipe 9b is refrigerated. Diluted ammonia aqueous solution flowing from the separator 3 via the liquid heat exchanger 4 into the top of the absorber 5 will absorb ammonia vapor once contacting the mixed gas coming from the vapor heat exchanger 9, hence only remaining the hydrogen gas. Because the hydrogen gas is insoluble in water and is lighter, it will rise into the evaporator 8 along the outer pipe 9b of the vapor heat exchanger 9 to mix with the ammonia vapor again. The absorber 5 has fins 5a outside cooled by air. This will refrigerate diluted ammonia aqueous solution and enhance its capability of absorption.

Simultaneously, when diluted ammonia aqueous solution absorbs ammonia vapor, it will also release heat. Therefore, using the air-cooled fins 5a to remove heat will enhance continual circulation of the system. When the weak solution absorbs a large amount of ammonia vapor, it becomes concentrated ammonia aqueous solution and descends to the bottom of the absorber 6, and continually descends back into the generator 1 via the liquid heat exchanger 4 and the analyzer 11 to start another circulation.

The prior art has the following drawbacks. Mutual flow between ammonia liquid, ammonia, and hydrogen gas in the evaporator affects the whole stability, and requires a very long pipeline, which is very uneconomic. Furthermore, the vapor heat exchanger, the liquid heat exchanger, and the absorber also have very long pipelines, hence increasing the flow path of pipeline and the whole volume. Therefore, the prior art has a very large volume, which cannot be reduced. The present invention aims to resolve the above problems in the prior art.

SUMMARY OF THE INVENTION

One object of the present invention is to provide a structure of the evaporation region of an absorption diffusion type refrigerating circulation. The evaporator at the evaporation region has a simple shape and structure. An ammonia liquid pipe and a hydrogen pipe are simultaneously arranged in the evaporator. The evaporator has a simple and symmetrical shape, and can be processed easily, hence saving the space thereof. Moreover, because the ammonia liquid pipe and the hydrogen pipe are arranged in the evaporator, heat exchange already occurs during the flowing course, allowing reaction being performed at low temperatures and pressures. Quick flow of ammonia liquid is also enhanced.

When ammonia vapor flows inversely, it can absorb heat quickly. All the above are very good designs of heat exchange, letting the refrigerating temperature at the evaporator be lower, reducing the system weight, and shrinking the volume. Therefore, the present invention can produce smaller refrigerating structures of better operation, letting portable refrigerating structures be feasible.

The refrigerating circulation of the present invention comprises a generator, a rectifier, a condenser, an evaporator, a concentrated ammonia aqueous solution tank, and an absorber. A pipeline of the evaporator is disposed at the evaporation region. When the concentrated ammonia aqueous solution flows out from the concentrated ammonia aqueous solution tank, it is heated to bubble and flow to the pipeline of the condenser to condense into ammonia liquid, which is then guided into the pipeline of the evaporator via the ammonia liquid pipe. The absorber is connected with the concentrated ammonia liquid tank. When the ammonia vapor and hydrogen gas pass through the absorber, the ammonia vapor will be absorbed by diluted ammonia aqueous solution to become into concentrated ammonia aqueous solution in the spiral device.

The concentrated ammonia aqueous solution then flows back to the concentrated ammonia solution tank. The diluted ammonia vapor and the hydrogen gas flow via the airway to the hydrogen pipe, which penetrates into one end of the pipeline of the evaporator. Ammonia liquid and hydrogen gas are simultaneously released out from the other closed end of the pipeline of the evaporator to let the ammonia liquid evaporate and absorb heat, hence performing the reaction of heat exchange to absorb heat and refrigerate. The generated ammonia vapor and hydrogen gas will mix together and flow back into the concentrated ammonia aqueous solution tank via a guide-in pipe.

The various objects and advantages of the present invention will be more readily understood from the following detailed description when read in conjunction with the appended drawing, in which:

DETAILED DESCRIPTION OF THE PREFERRED EMBODIMENTS

Figure 1:
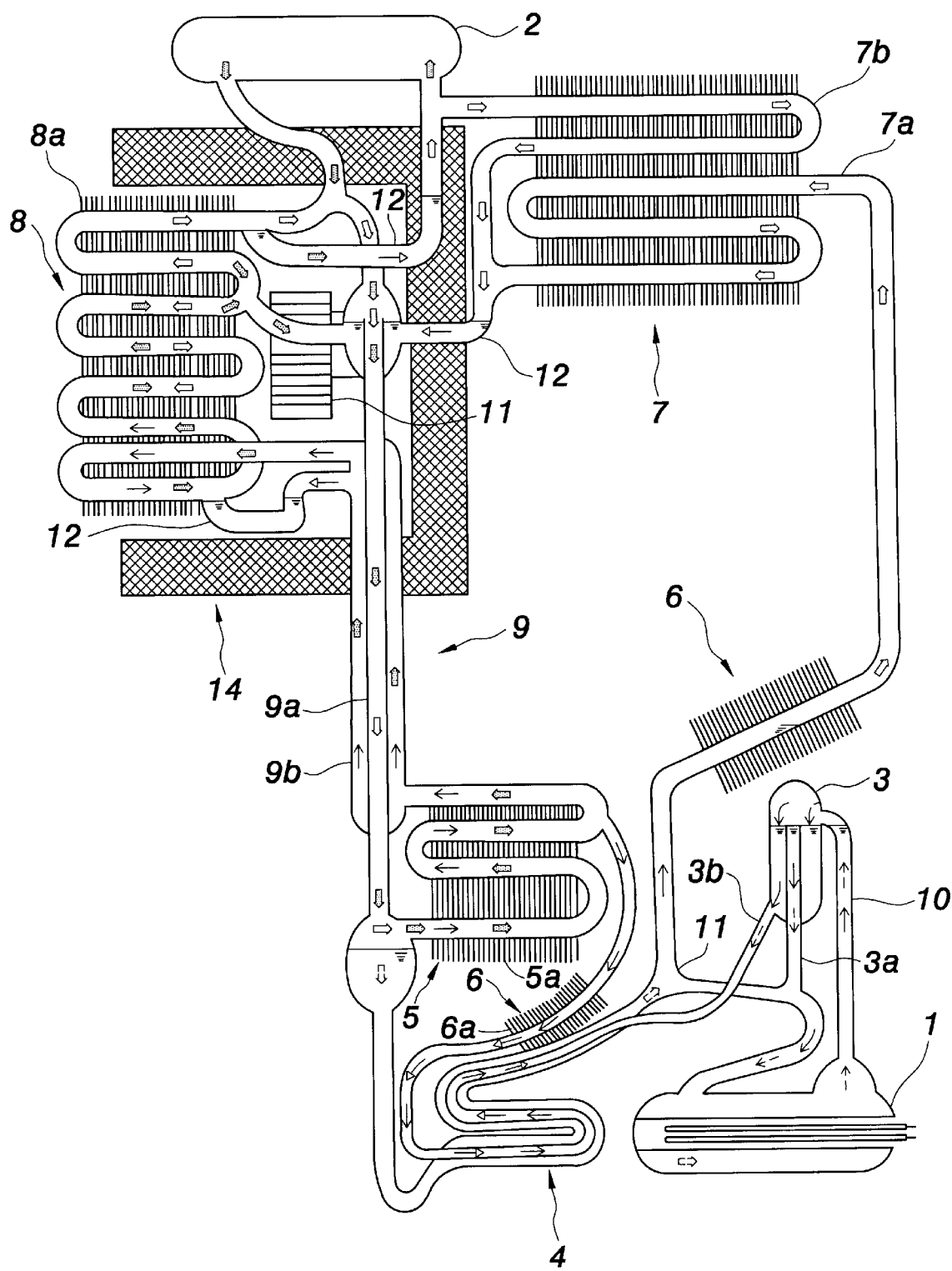
FIG. 1 is a diagram showing the arrangement of the prior art pipeline.

As shown in FIGS. 2 to 9, the present invention provides a structure of the evaporation region of an absorption diffusion type refrigerating circulation. The absorption diffusion type refrigerating structure has a concentrated ammonia aqueous solution tank 31 to receive concentrated ammonia aqueous solution 71. The concentrated ammonia aqueous solution 31 tank is led out by a concentrated ammonia aqueous solution pipe 32. The pipe mouth 321 of the concentrated ammonia aqueous solution pipe 32 is situated in the concentrated ammonia aqueous solution tank 31, and protrudes out of the inner bottom face of the concentrated ammonia aqueous solution tank 31 or joins the side face of the concentrated ammonia aqueous solution tank 31 to prevent residue from entering the concentrated ammonia aqueous solution pipe 32. Residue will accumulate on the bottom face of the concentrated ammonia aqueous solution tank 31, and will not choke the pipe mouth 321 of the concentrated ammonia aqueous solution pipe 32. The concentrated ammonia aqueous solution pipe 32 can also be connected out from the end face of a horizontal pipe type concentrated ammonia aqueous solution tank 31.

The concentrated ammonia aqueous solution pipe 32 penetrates into a diluted ammonia aqueous solution pipe 37, which passes through a generator 30. The generator 30 has a heater 33 outside to heat the diluted ammonia aqueous solution pipe 37 and the concentrated ammonia aqueous solution pipe 32. Part surface of the generator 30 is sheathed by a constricting tube 34 and an adiabatic body 35. The adiabatic body is situated outside the diluted ammonia aqueous solution pipe 37. The constricting tube 34 is situated outside the adiabatic body 35.

The heater 33 heats ammonia aqueous solution in the concentrated ammonia aqueous solution pipe 32 to separate out ammonia vapor 72 and generate vapor and liquid mixed bubble flow of diluted ammonia aqueous solution 74 and the ammonia vapor 72. The mixed bubble flow in the concentrated ammonia aqueous solution pipe 32 further includes the evaporated ammonia vapor 72 and water steam 73. They together rise to a pipeline of a rectifier 51. The diluted ammonia aqueous solution 74 flows out from a separator 36, i.e., the distal end of the concentrated ammonia aqueous solution pipe 32, reflows vertically downwards from the diluted ammonia aqueous solution pipe 37 through the action of gravity, passed through the generator 30, and then reflows to near the concentrated ammonia aqueous solution tank 31 along the diluted ammonia aqueous solution pipe 37.

An enlarged pipe or the periphery of the diluted ammonia aqueous solution pipe 37 joins a diluted ammonia aqueous solution reflow pipe 38, which is connected to an absorber 40. The distal end of the diluted ammonia aqueous solution reflow pipe 38 is lower than the separator 36, so that the diluted ammonia aqueous solution 74 can naturally flow back into the absorber 40 through the action of gravity. The outer surface of the distal end of the diluted ammonia aqueous solution reflow pipe 38 can have a plurality of pre-refrigerating fins 39 to cool the diluted ammonia aqueous solution 74 in advance.

The pipeline at the rectifier 51 forms a curved pipe shape. Because the ammonia vapor 72 in this section also contains water steam 73, which is detrimental to the reaction of evaporation, the pipeline of the rectifier 51 is used to cool the water steam 73 or the ammonia vapor 72 to let the water steam 73 condense into liquid water 70 and part of the ammonia vapor 72 condense into ammonia liquid 76, which then reflow to the diluted ammonia aqueous solution pipe 37 along the rectifier 51.

High purity ammonia vapor 75 enters a condenser 50, which comprises a first pipeline 52 of condenser and a second pipeline 55 of condenser. A plurality of first fins 53 and second fins 56 are disposed outside the first pipeline 52 of condenser and the second pipeline 55 of condenser, respectively. An adapting block 54 of condenser is connected between the two pipelines 52 and 55 to save the occupied space. The first fins 53 and the second fins 56 are respectively disposed on the first pipeline 52 and the second pipeline 55 to more quickly condense the ammonia vapor 75 into the ammonia liquid 76.

Because the pipelines 52 and 55 are slantingly disposed and are of reflected shape, the ammonia liquid 76 will flow to the distal end of the second pipeline 55. The distal end of the second pipeline 55 joins a first ammonia liquid pipe 57.

The front section of the first ammonia liquid pipe 57 has a plurality of third fins 58 to enhance cooling effect. The first ammonia liquid pipe 57 then penetrates into a pipeline 62 of an evaporator 60 via a second ammonia liquid pipe 59.

Figure 2:
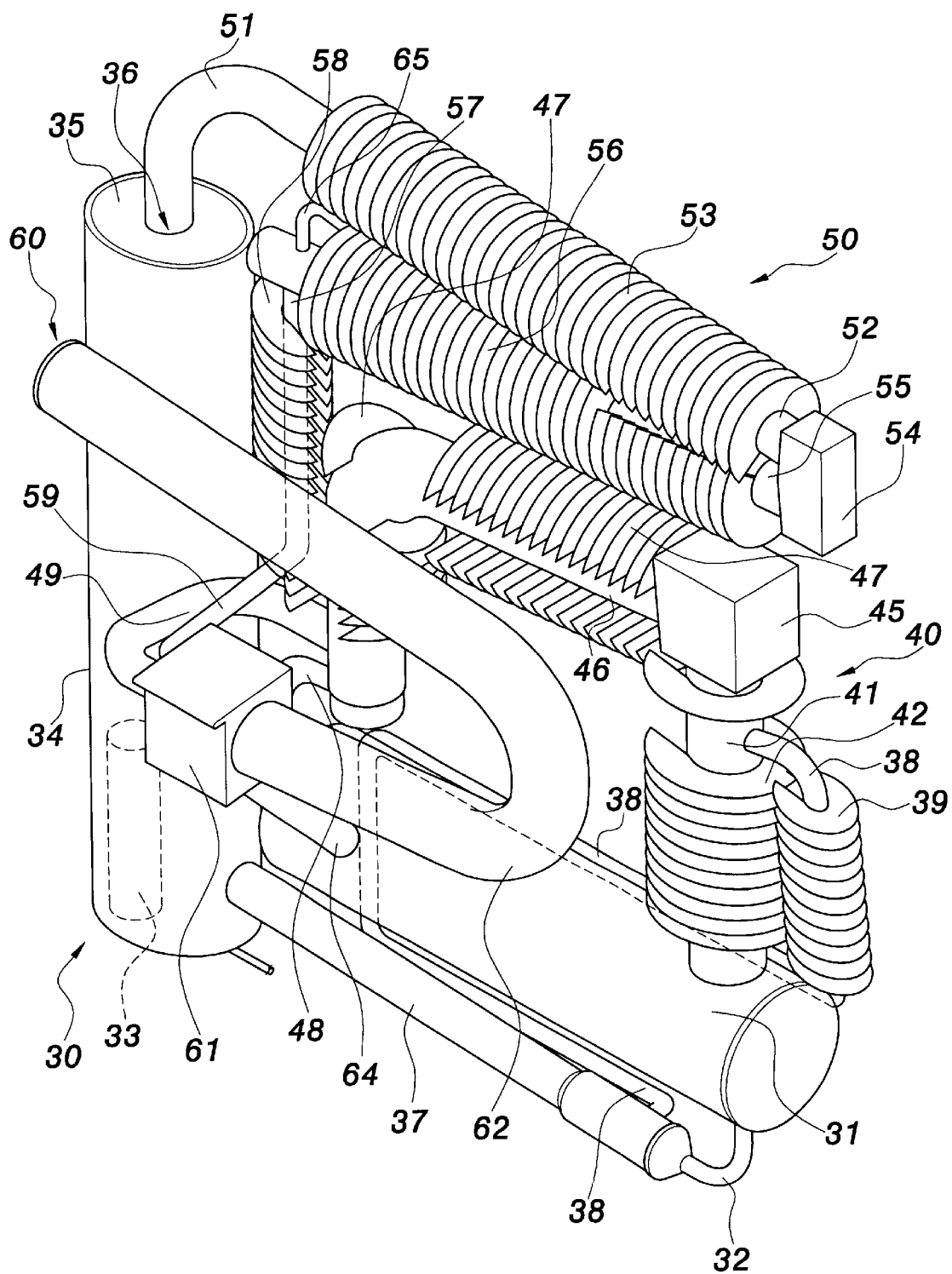
FIG. 2 is a perspective view of the present invention.
Figure 3:
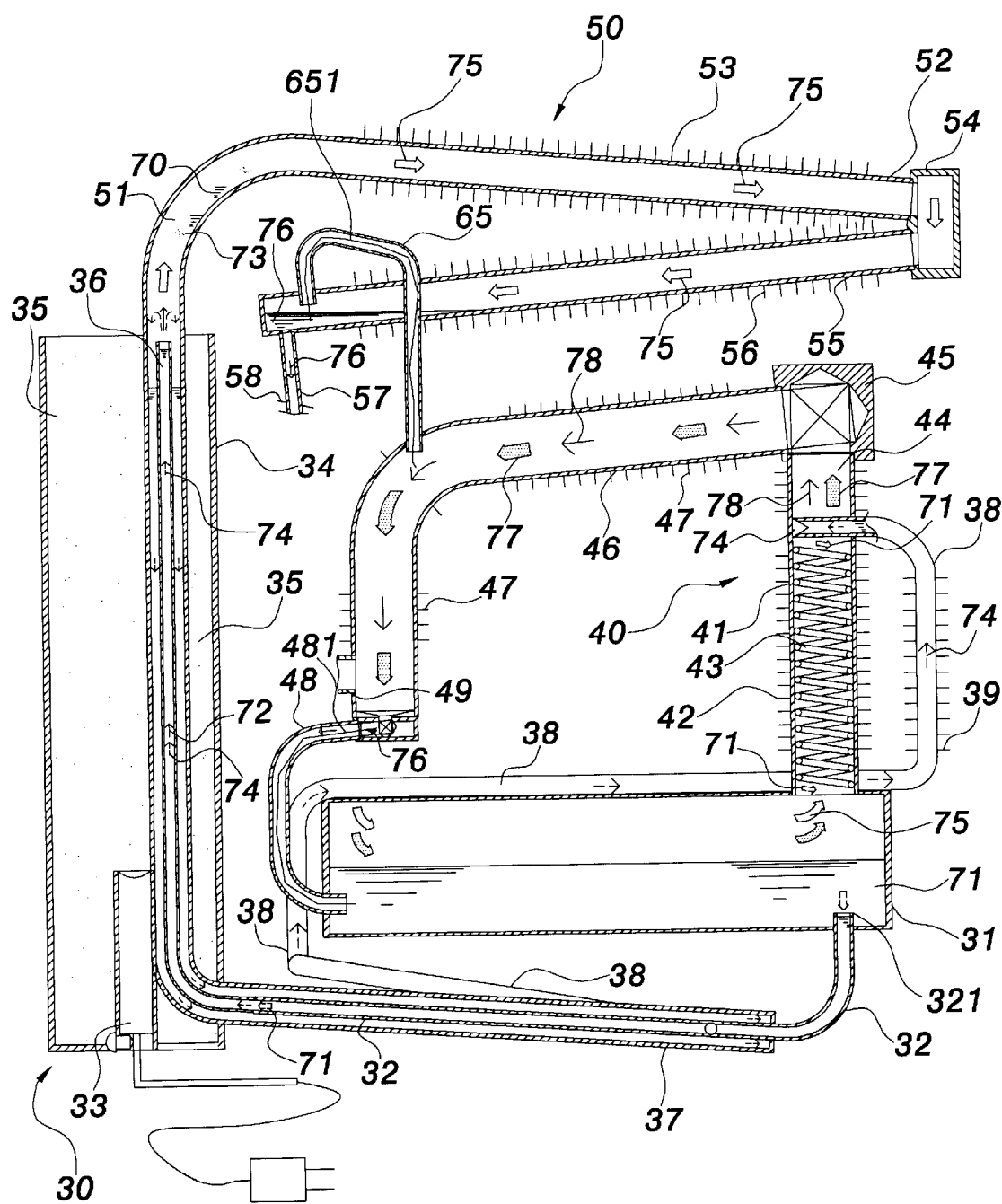
FIG. 3 is a longitudinal cross-sectional view of the present invention.

A liquid-shutting loop is formed between two ends of the ammonia liquid pipe comprising the first ammonia liquid pipe 57 and the second ammonia liquid pipe 59. The liquid-shutting loop can be U-shaped or spiral. In FIG. 2, the whole ammonia liquid pipe is U-shaped to directly form a liquid-shutting loop.

Figure 7:
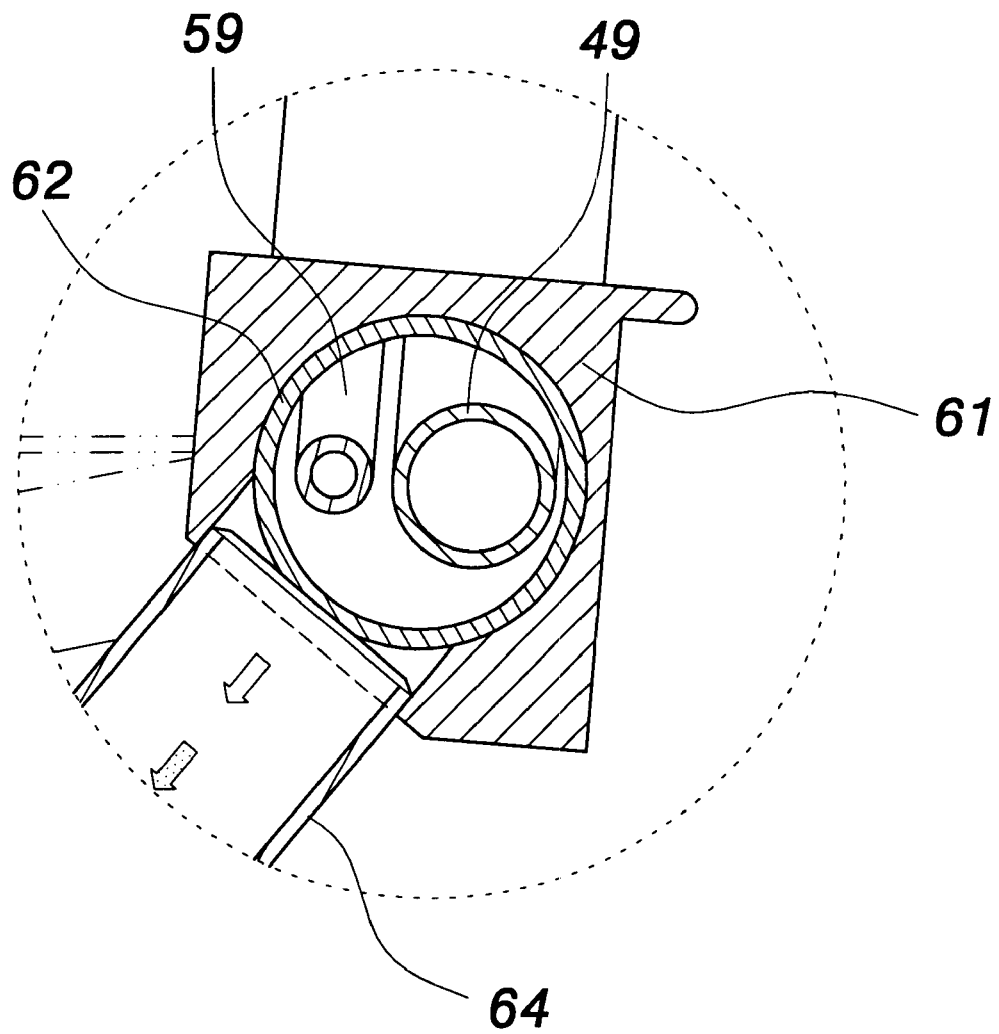
FIG. 7 is a cross-sectional view of the B—B part shown in FIG. 5.
Figure 8:
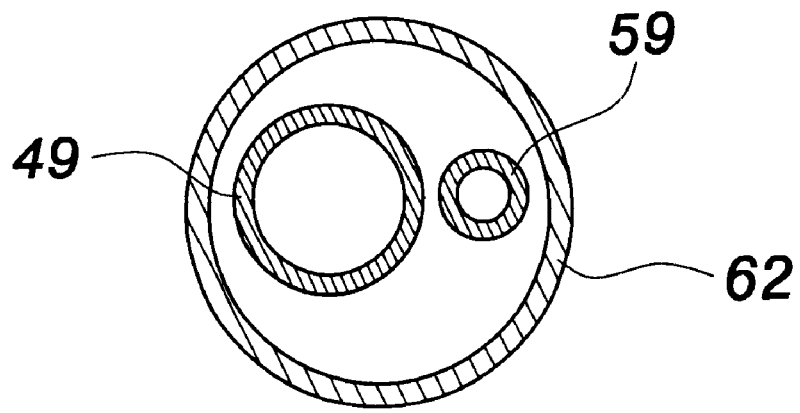
FIG. 8 is a cross-sectional view of the C—C part shown in FIG. 5.

As shown in FIG. 7, the other end of the second ammonia liquid pipe 59 is open. The open end is of downwards curved shape to form a outflow mouth for guidance, hence guiding out ammonia liquid and preventing ammonia liquid from creeping on the outer pipe wall of the second ammonia liquid pipe 59. Therefore, the outflow ammonia liquid will expand, so that the refrigerating capability will not be affected because the ammonia liquid pipe is arranged in evaporator 60.

After the first ammonia liquid pipe 57 passes through a bearing block 61, the second ammonia liquid pipe 59 is contained in the pipeline 62. In fact, the first ammonia liquid pipeline 57 and the second ammonia liquid pipeline 58 are the same pipeline. Similarly, the diluted ammonia aqueous solution pipe 37, the pipeline of the rectifier 51, the first pipeline 52 of condenser, and the second pipeline 55 of condenser are the same pipeline. These designs can facilitate manufacturing.

One end of the absorber pipeline 41 of the absorber 40 joins the concentrated ammonia aqueous solution tank 31. The absorber 40 has the reflowing diluted ammonia aqueous solution 74 therein. The absorber pipeline 41 has a plurality of absorber fins 42 outside. The inner wall of the absorber pipeline 41 has a spiral device 43, so that the diluted ammonia aqueous solution 74 can go around downwards along the inner peripheral wall of the absorber pipeline 41. Mixed flow formed of hydrogen gas 77 and ammonia vapor 79 flowing in from the evaporator 60 exists above the liquid face in the concentrated ammonia aqueous solution tank 31.

When the mixed flow flowing from the evaporator 60 passes by the liquid face of concentrated ammonia aqueous solution 71, it performs a first absorption reaction to absorb ammonia vapor 75 separated out from the mixed flow. The mixed flow is then guided into the absorber 40 to perform a second absorption reaction. The ammonia vapor 75 enters the pipeline 41 of the absorber 40 and reacts with the diluted ammonia aqueous solution 74 to become into the concentrated ammonia aqueous solution 71, which then reflows to the concentrated ammonia aqueous solution tank 31 along the spiral device 43. The above absorber can also be replaced with a coiled pipe type absorber.

In addition, a pressing region 44 is formed near the other end of the absorber pipeline 41. The pressing region 44 is situated above the absorber pipeline 41 and the diluted ammonia aqueous solution reflow pipe 38. The pressing region 44 utilizes gravity to press the ammonia vapor 75. The other end of the absorber pipeline 41 joins an absorber guide block 45, which is connected with an airway 46. The airway 46 has a plurality of cooling fins 47 outside to further condense not wholly absorbed ammonia vapor into the ammonia liquid 76.

Because the airway 46 is bent downwards, after the ammonia vapor 75 and the hydrogen gas 77 are absorbed by the absorber 40, part of the ammonia vapor 75 and the reflowing diluted ammonia aqueous solution 74 will react in the absorber 40 to become the reflowing concentrated ammonia aqueous solution 71, hence further reducing the amount of ammonia in the mixed flow. The diluted mixed gas of the diluted ammonia vapor 78 and the hydrogen gas 77 then flows through the airway 46. Because the distal end of the airway 46 is largely pure hydrogen gas 77, the airway 46 joins an upward hydrogen pipe 49 to guide the hydrogen gas 77 upwards.

Figure 4:
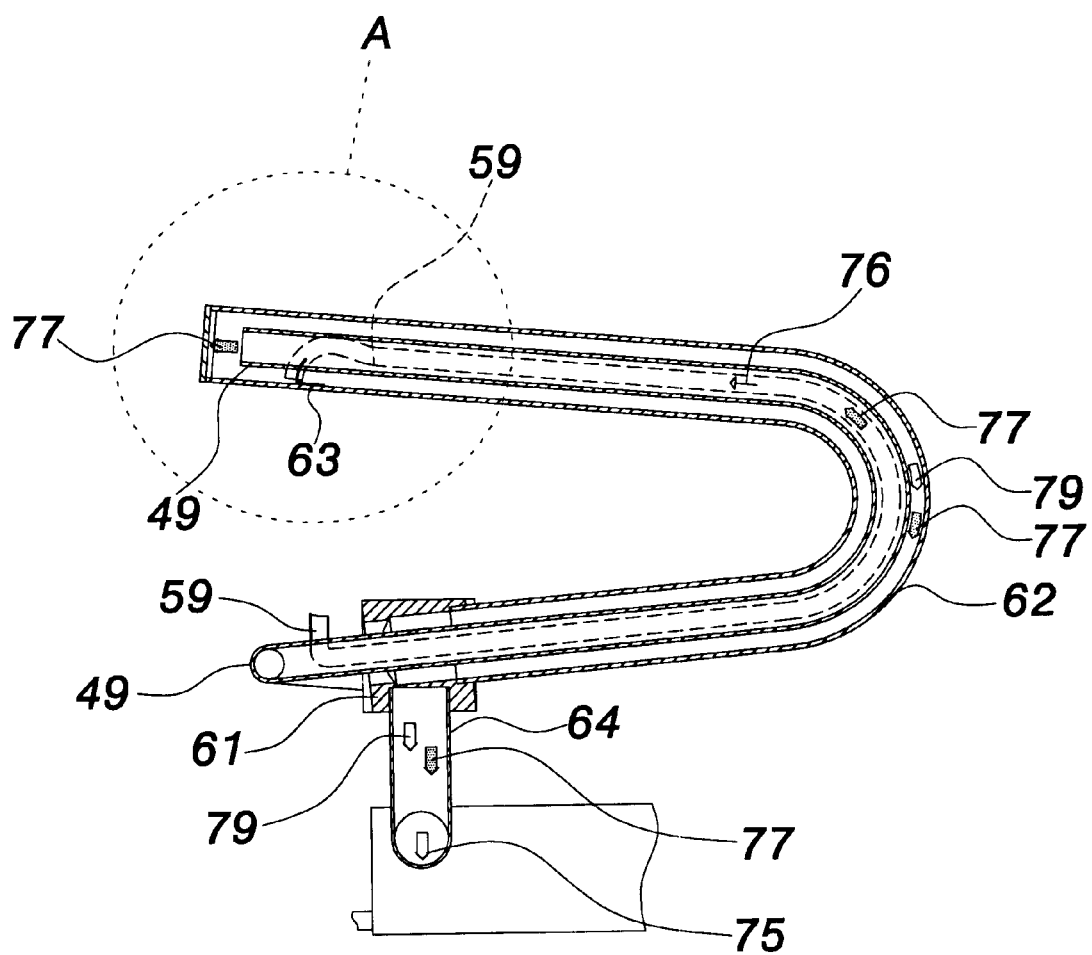
FIG. 4 is a longitudinal cross-sectional view of an evaporator of the present invention.
Figure 5:
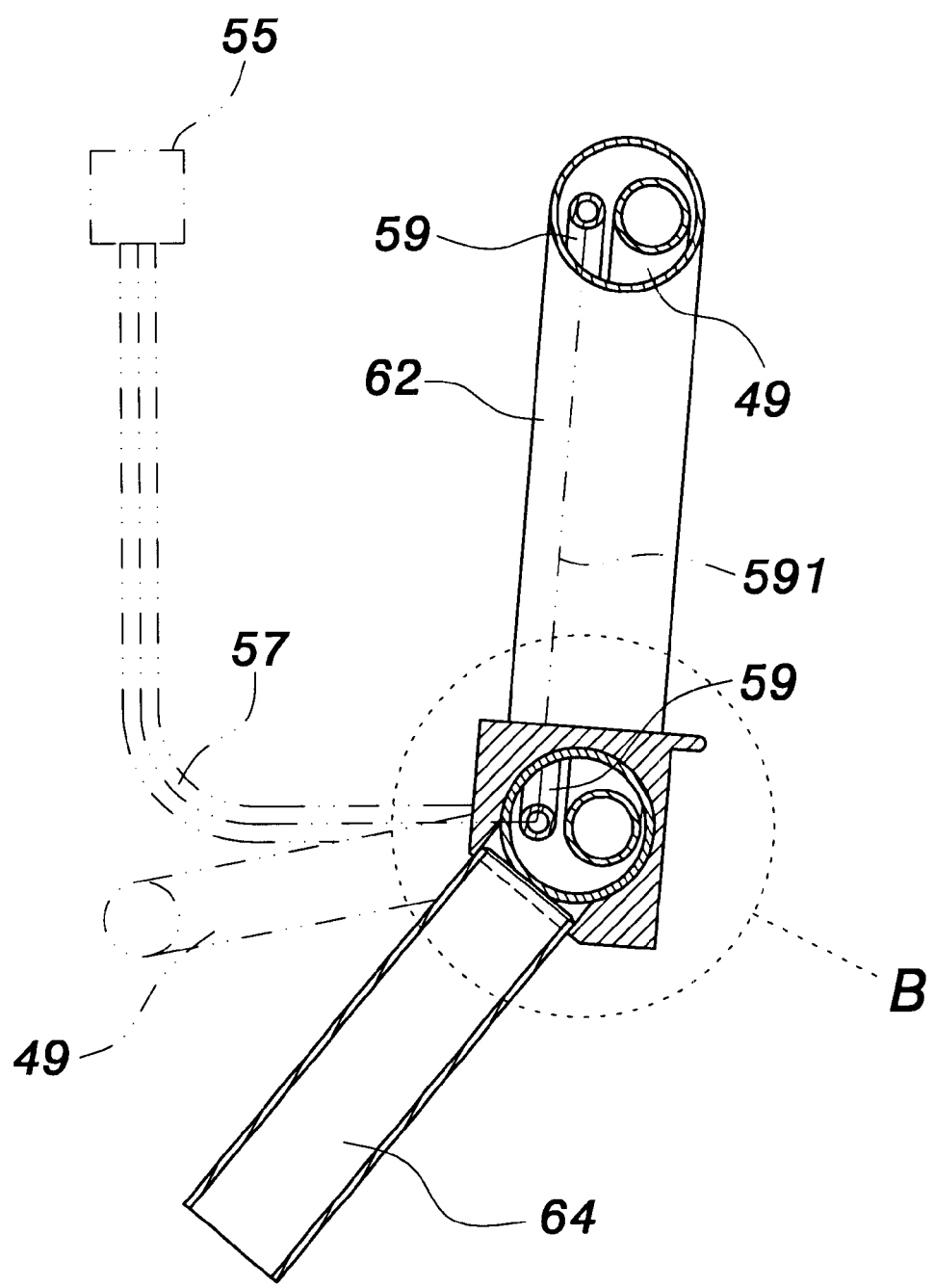
FIG. 5 is a transversal cross-sectional view of an evaporator of the present invention.
Figure 6:
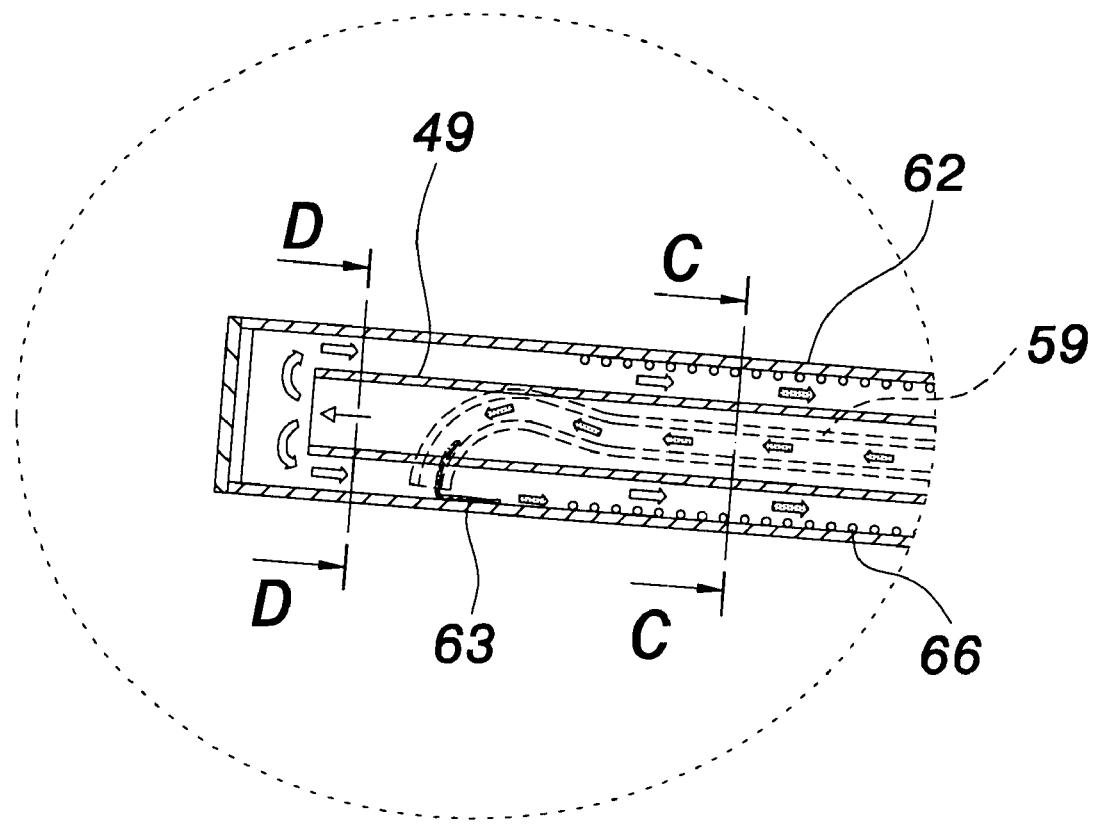
FIG. 6 is a partly enlarged view of the part A shown in FIG. 4.

The distal end of the airway 46 is connected to the concentrated ammonia aqueous solution tank 31 via an ammonia liquid guide pipe 48. The ammonia liquid guide pipe 48 can have a capillary device 481 to avoid liquid-shutting phenomenon due to a too-small caliber. The other end of the ammonia liquid guide pipe 48 is connected to a position below the liquid face of the concentrated ammonia aqueous solution tank 31. The hydrogen pipe 49 also passes through the bearing block 61 to penetrate into the pipeline 62 of the evaporator 60. As shown in FIGS. 4 and 5, the pipeline 62 of the evaporator 60 is simultaneously abreast of the hydrogen pipe 49 and the second ammonia liquid pipe 59.

The pipeline 62 of the evaporator 60 can be of bent sideward-U shape. The hydrogen pipe 49 and the second ammonia liquid pipe 59 form exits near inside the other end of the pipeline 62 to simultaneously release the ammonia liquid 76 and the hydrogen gas 77. Therefore, the ammonia liquid 76 and the hydrogen gas 77 can perform evaporation reaction of heat exchange to absorb heat and refrigerate. After being evaporated, the generated mixed gas of the ammonia vapor 79 and the hydrogen vapor 77 will reflow together from the other end to be near one end of the pipeline 62 along the internal space of the pipeline 62. The pipeline 62 is connected to a guide-in pipe 64 to let the ammonia vapor 75 and the hydrogen gas 77 be discharged into the concentrated ammonia aqueous solution tank 31 via the guide-in pipe 64.

Figure 9:
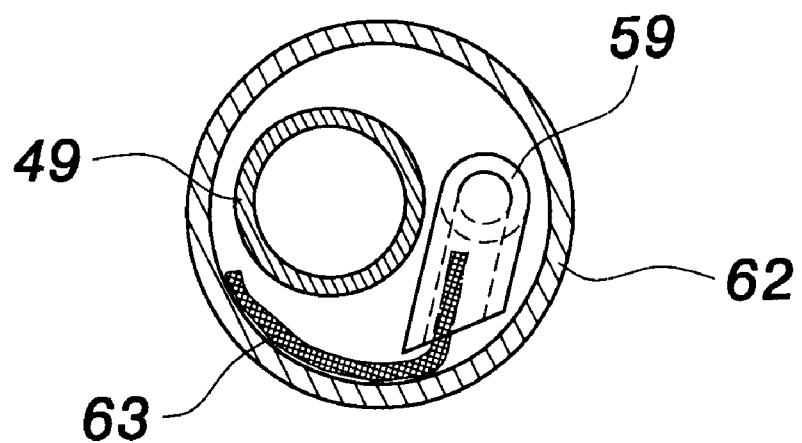
FIG. 9 is a cross-sectional view of the D—D part shown in FIG. 5.

The other end of the evaporator 60 is not higher than the distal end of the second pipeline 55, and forms a U-shaped connected pipe to let the ammonia liquid 76 flow naturally through the action of gravity and flow out from the other end of the pipeline 62. The speed of heat exchange at this position is high to facilitate the outflow of the ammonia liquid. As shown in FIGS. 7 and 9, the distal end of the second ammonia liquid pipe 59 has a capillary device 63 of evaporator to achieve very better effect of guidance. Simultaneously, the capillary device 63 of evaporator is utilized to expand the evaporation area of ammonia liquid for facilitating evaporation of ammonia liquid into ammonia vapor, hence enhancing the refrigerating efficiency. Through the help of forward guidance, the evaporator 60 of the present invention can achieve very fast heat exchange.

A pressure equilibrium pipe 65 can further be disposed between the top face of the distal end of the second pipeline 55 of the condenser 50 and the top face of the bent section of the airway 46 to achieve equilibrium of pressure of the system. Furthermore, a capillary device 651 can be disposed in the pressure equilibrium pipe 65 to avoid liquid shutting phenomenon due to condensation.

Additionally, a spiral device of evaporator 66 is disposed on the inner pipe wall of the pipeline 62 of the evaporator 60. The spiral device 66 is a spiral groove or concentrically circular grooves formed on the inner pipe wall, a spiral spring or fiber bundle arranged therein, or a capillary device, all of which can facilitate the expansion of the liquid face of ammonia aqueous solution and thus enhance the refrigerating performance. The capillary device is formed of knitted net, sintered powder, fiber bundle, or foaming metal.

To sum up, in the present invention, a common pipe type evaporator is used to let the condensed ammonia liquid and hydrogen gas be guided into the evaporator together in a special way. Moreover, the open end of the ammonia liquid pipe has a capillary device and forms a curved shape to facilitate the action of guidance. In other words, the capillary device is used to guide the expansion of the ammonia liquid and to prevent the ammonia liquid from only creeping along the outer surface of the ammonia liquid pipe. The disposition of the capillary device can greatly improve the cold status of evaporation. Furthermore, a spiral device for resisting flow and expanding the surface area of evaporation of the ammonia liquid is disposed in the pipeline of the evaporator. Therefore, the present invention can use the most economic pipeline of the evaporator to form the best flow path, thereby greatly shrinking the whole structure, generating better heat exchange, reducing the volume and weight of the refrigerating structure, and obtaining better refrigerating effect as compared to the prior art.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A structure of an evaporation region of an absorption diffusion type refrigerating circulation, comprising:

an ammonia liquid pipe, one end thereof being used to guide in ammonia liquid, a liquid-shutting loop being formed between two ends thereof, one end thereof being lower than a guide-in end and joining a capillary device, said capillary device being used to guide expansion of ammonia liquid and to prevent ammonia liquid from only creeping along an outer surface of said ammonia liquid pipe after flowing out;

a hydrogen pipe having one end used to guide in hydrogen gas; and an evaporator having a closed pipeline, said hydrogen pipe and said ammonia liquid pipe penetrating into said pipeline from a lower end of said evaporator side by side and extending to an upper end along said pipeline, ammonia liquid and hydrogen gas being released out at the upper end of said evaporator, so that ammonia liquid evaporates to absorb heat and performs action of heat exchange, ammonia vapor being generated and hydrogen gas flowing back together and then being discharged.

2. The structure of the evaporation region of an absorption diffusion type refrigerating circulation as claimed in claim 1, wherein said ammonia liquid pipe is connected to a condenser, said hydrogen pipe is connected to an absorber, and said evaporator is connected to a concentrated ammonia aqueous solution tank.

3. The structure of the evaporation region of an absorption diffusion type refrigerating circulation as claimed in claim 1, wherein the open end of said ammonia liquid pipe is of downwards curved shape.

4. The structure of the evaporation region of an absorption diffusion type refrigerating circulation as claimed in claim 1, wherein said liquid-shutting loop of said ammonia liquid pipe is U-shaped.

5. The structure of the evaporation region of an absorption diffusion type refrigerating circulation as claimed in claim 1, wherein said capillary device at the open end of said ammonia liquid pipe is made of knitted net, sintered powder, fiber bundle, or foaming metal.

6. The structure of the evaporation region of an absorption diffusion type refrigerating circulation as claimed in claim 1, wherein said pipeline of said evaporator further has a spiral device of evaporator therein.

7. The structure of the evaporation region of an absorption diffusion type refrigerating circulation as claimed in claim 6, wherein said spiral device of evaporator is a spiral groove, concentric grooves, a spiral spring or a spiral fiber bundle.

8. The structure of the evaporation region of an absorption diffusion type refrigerating circulation as claimed in claim 6, wherein said spiral device of evaporator is a capillary device.

9. The structure of the evaporation region of an absorption diffusion type refrigerating circulation as claimed in claim 8, wherein said capillary device is made of knitted net, sintered powder, fiber bundle or foaming metal.

* * * * *